United States Patent
Kim et al.

(10) Patent No.: US 6,822,591 B2
(45) Date of Patent: Nov. 23, 2004

(54) LOGIC ELEMENT EMPLOYING SATURABLE ABSORBER

(75) Inventors: Hyun Soo Kim, Daejon-Shi (KR); Jong Hoi Kim, Daejon-Shi (KR); Eun Deok Sim, Daejon-Shi (KR); Kang Ho Kim, Daejon-Shi (KR); Oh Kee Kwon, Anyang-Shi (KR); Kwang Ryong Oh, Daejon-Shi (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 10/682,453

(22) Filed: Oct. 8, 2003

(65) Prior Publication Data

US 2004/0085828 A1 May 6, 2004

(30) Foreign Application Priority Data

Oct. 31, 2002 (KR) .............................. 10-2002-0067218

(51) Int. Cl.[7] .............................................. H03M 1/00
(52) U.S. Cl. ........................ 341/137; 359/339; 385/24
(58) Field of Search ......................... 341/137; 359/333, 359/349, 339, 348; 385/24, 37, 45, 39

(56) References Cited

U.S. PATENT DOCUMENTS

| 5,625,479 | A  | * | 4/1997 | Suzuki et al. ................. 398/98 |
| 6,222,669 | B1 | * | 4/2001 | Roberts et al. ............. 359/337 |
| 6,271,960 | B1 |   | 8/2001 | Michishita et al. |
| 6,292,119 | B1 | * | 9/2001 | Carillo et al. ............... 341/137 |
| 6,549,697 | B1 | * | 4/2003 | Bigo et al. .................... 385/24 |

FOREIGN PATENT DOCUMENTS

JP  4-75749  5/1993

OTHER PUBLICATIONS

T.Fjelde, et al.; Demonstration of 20 Gbit/s All–Optical . . . Wavelength Converter; Electronics Letters, Oct. 26, 2000, vol. 36, No. 22, pp 1863–1864.

T.Fjelde, et al.; "10 Gbit/s all–optical logic . . . wavelength converter" Electronics Letters, Apr. 27, 2000, vol. 36, No. 9, pp 813–815.

* cited by examiner

*Primary Examiner*—Michael Tokar
*Assistant Examiner*—John B Nguyen
(74) *Attorney, Agent, or Firm*—Blakely Sokoloff Taylor & Zafman

(57) ABSTRACT

The present invention relates to all-optical OR and XOR logic elements employing saturable absorbers as optical gates. Saturable absorbers are arranged in paths of the Mach-Zehnder interferometer, respectively. If the total power of an input optical signal and a continuous wave signal is higher than a transparent input power of the saturable absorbers, the input optical signal passes through the saturable absorbers, and then the optical signals through the two paths are combined, so that it is possible to obtain the operational characteristics of the OR and XOR logic elements.

According to the present invention, unlike the optical logic element using a cross-phase modulation by a semiconductor optical amplifier, phase difference depending upon the input optical power is not generated between two paths, so that it is possible to alleviate a restriction of an allowable range of the input optical power.

7 Claims, 8 Drawing Sheets

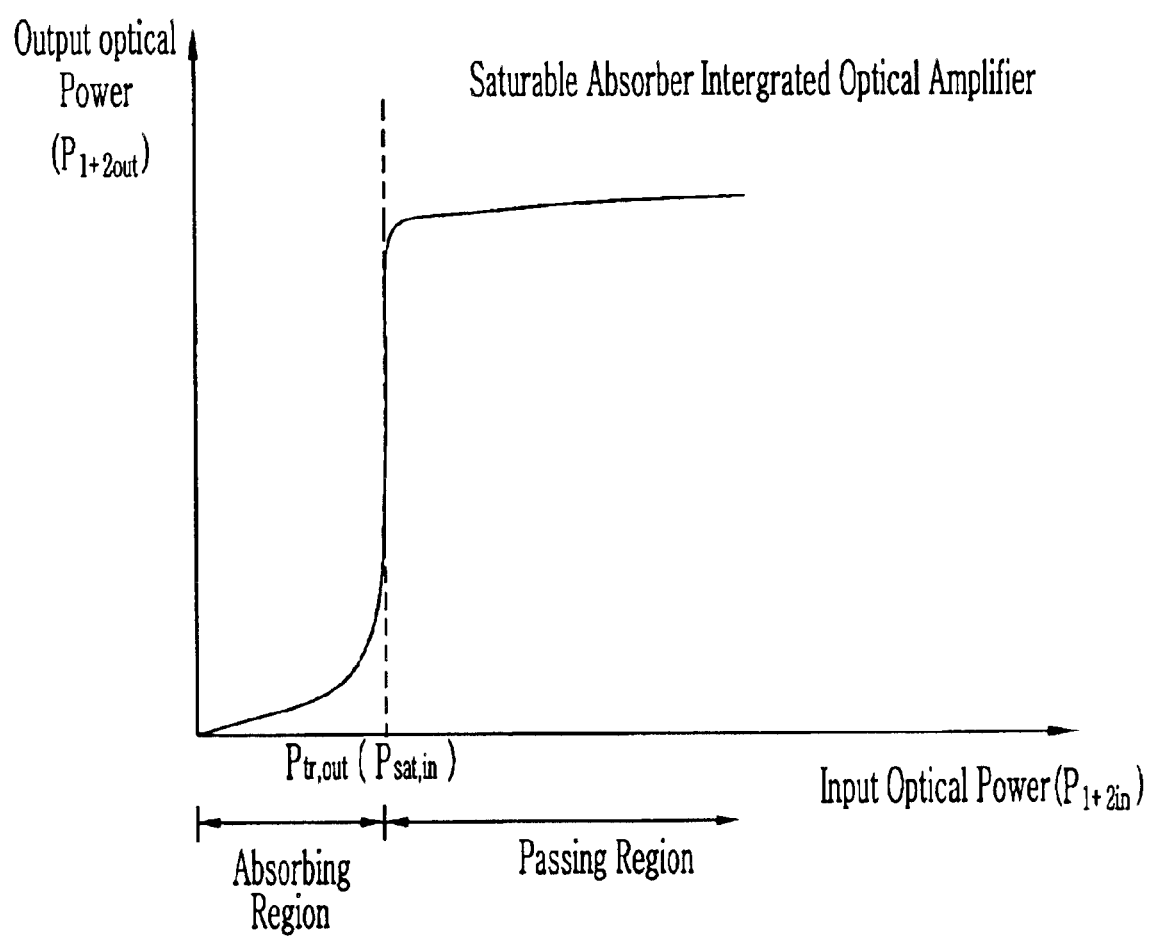

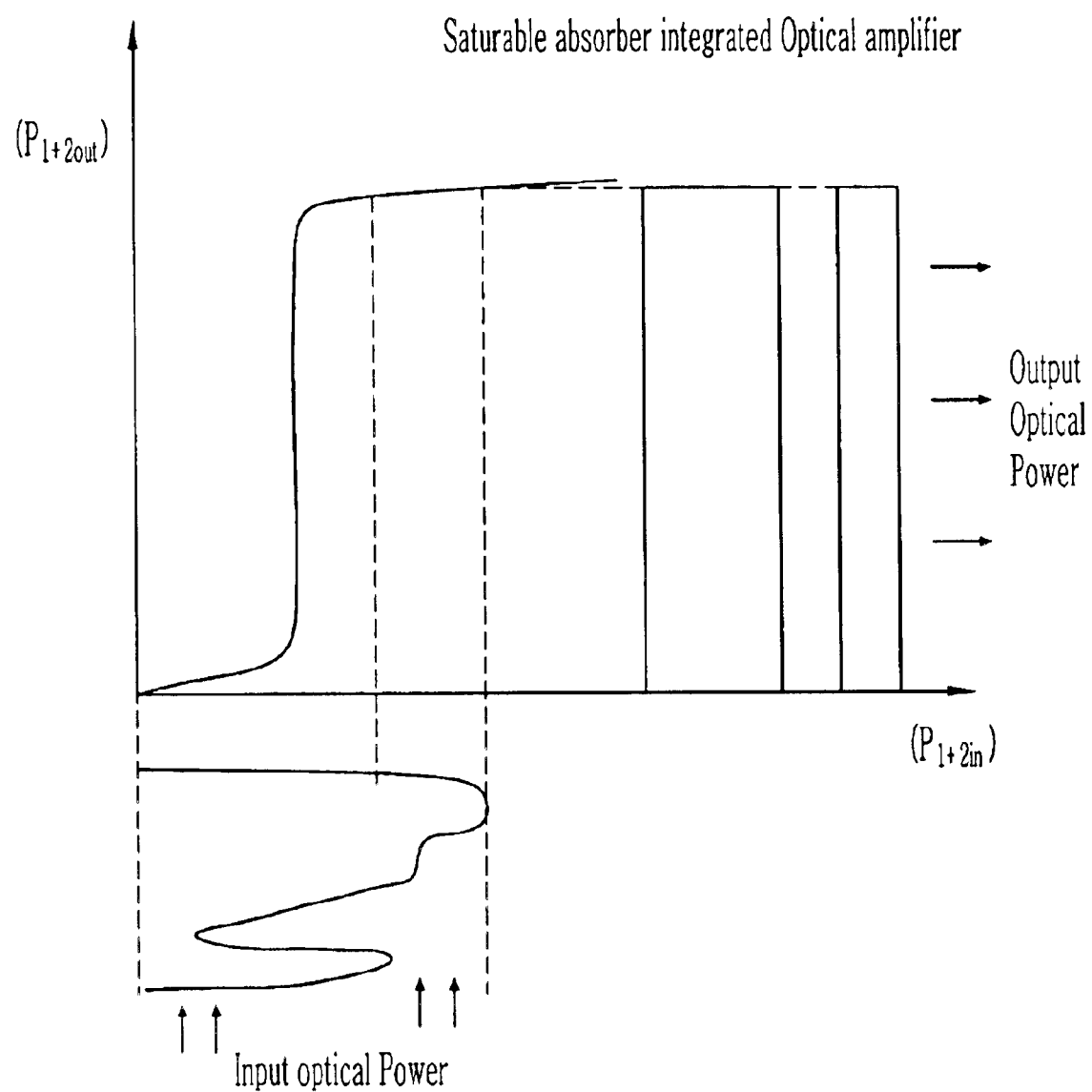

LOGIC ELEMENT EMPLOYING SATURABLE ABSORBER

BACKGROUND OF THE INVENTION

1. Field of the Invention

The present invention relates to all-optical OR and XOR logic elements, and more particularly, to all-optical OR and XOR logic elements employing saturable absorbers as optical gates.

2. Description of the Prior Art

Generally, a computing system is constructed by integrating gates such as AND, OR, XOR, NAND, NOR, NXOR, etc. Conventional computing systems have processed electrical signals using silicon-based devices. The conventional computing systems have restrictions on a processing speed and a capacity because needs for high speed and large capacity of the systems have been recently increased. To overcome the restrictions, a computing system having optical elements excellent in the processing speed or the capacity has been developed.

In particular, a number of researches and developments have been made on OR and XOR logic elements such as an XOR gate using an ultra-fast non-linear interferometer (UNI) disclosed in "20 Gbps All-optical XOR with UNI gate", IEEE Photonic Technol., Vol. 12, pp. 834–836, (2000), by C. Bintjas et al., an XOR gate using a Sagnac gate disclosed in "10 GHz Boolean XOR with semiconductor optical amplifier fiber Sagnac gate", CLEO, CThF5 (1999), by K. Zoiros et al., an OR gate using an interferometric wavelength converter disclosed in "10 Gbps All-optical logic OR in monolithically integrated interferometric wavelength converter", Vol. 36, IEEE Electron. Lett., pp. 813–815 (2000), by T. Fjelde et al., an XOR gate disclosed in "Demonstration of 20 Gbps All-optical logic XOR in integrated SOA-based interferometric wavelength converter", Vol. 36, pp. 1863–1864, (2000), by T. Fielde et al., and so forth.

Although the XOR gate using an ultra-fast nonlinear interferometer (UNI) and the XOR gate using a Sagnag gate have an advantage of high speed, they have also some disadvantages that it is difficult to adapt them to optical computing systems requiring a high degree of integration, due to the complexity of their essential elements consisting of optical fiber and the difficulty in integration with other elements.

Meanwhile, a semiconductor optical amplifier (SOA) uses a gain characteristic of semiconductor to amplify an input optical signal by its gain. Also, the semiconductor optical amplifier directly amplifies the optical signal without converting the optical signal into an electrical signal. Further, the semiconductor optical amplifier is constructed to have a structure similar to a semiconductor laser using compound semiconductor materials, and is subjected to a anti-reflecting thin film processing. For this reason, the semiconductor optical amplifier can amplify the optical signals by a high gain in a wide wavelength range in an optical communication system having wavelength band of 1.55 $\mu$m. Furthermore, the semiconductor optical amplifier has a smaller size than a conventional erbium-doped amplifier (EDFA) and can be monolithically integrated with other semiconductor optical elements and passive waveguides. Accordingly, the semiconductor optical amplifier is useful in various fields of applications such as a wavelength converter, an optical switch, a logic element, etc.

Now, the conventional all-optical OR and XOR logic elements using a semiconductor optical amplifier will be described with reference to FIGS. 1A and 1B.

The element shown in FIG. 1A includes first and second optical amplifiers 7 and 8, a Y-combiner 4, and a Y-branch 5, whereas the element shown in FIG. 1B includes first and second optical amplifiers 17 and 18, Y-combiners 14a, 14b and 15b, a Y-branch 15a and a filter 19.

The logic element in FIG. 1A constitutes a Michelson interferometer, whereas the logic element in FIG. 1B constitutes a Mach-Zehnder interferometer. In the Michelson interferometer, a continuous-wave signal of $\lambda_{cw}$ is splitted by a Y-branch 5 and then inputted to the first and second optical amplifiers 7 and 8, respectively, whereas input optical signals of $\lambda s_1$ and $\lambda s_2$ are inputted to a first optical amplifier 7. In this case, the surface to which the continuous-wave signal of $\lambda_{cw}$ is provided with a anti-reflecting thin film 9, while the surface to which the input optical signals of $\lambda s_1$ and $\lambda s_2$ is provided with a reflection facet 6. It is known that if a surface is cleaved, that is, if a surface is not provided with the anti-reflecting thin film 9, its reflectivity reaches about 30%.

The Mach-Zehnder interferometer in FIG. 1B is distinguished from the Michelson interferometer in FIG. 1A in that anti-reflecting thin film 16a and 16b are deposited on both surfaces. That is, the Michelson interferometer as well as the Mach-Zehnder interferometer makes use of a cross-phase modulation, and the two interferometers are similar to each other in that the phase of the continuous-wave signal is varied depending on the optical power of an input optical signal when a semiconductor optical amplifier is gain saturated. However, the two interferometers are different from each other in that in the Michelson interferometer, one surface is designed to be reflective so that the total length of the element is reduced to a half. That is, the size of the Mach-Zehnder interferometer can be reduced to a half using the reflecting surface because of its symmetrical configuration.

The interferometers described above make use of the phase difference of two paths. Therefore, non-linear materials such as an optical amplifier play an important role. Also, in order to obtain a sufficient phase shift by $\pi$, a variety of methods of, e.g. lengthening an optical amplifier, significantly increasing amount of input current to the optical amplifier, or significantly increasing an input optical power are used. Although lengthening an optical amplifier is the easiest way among them, the method is restricted to some extent since the total length of the element is increased with increase of the length of the optical amplifier. The length of the Michelson interferometer can be decreased to a half of the length of the Mach-Zehnder interferometer because it uses the reflecting surface as described above. That is, since the input optical signal is reflected and returns from the reflecting surface, the input optical signal passes through the optical amplifier twice. Nevertheless, since the input continuous-wave signal and the output logic signal are outputted from the same surface in the Michelson interferometer, an expensive device such as a circulator is additionally required to divide the two signals.

The conventional Mach-Zehnder interferometer type OR and XOR logic elements using the semiconductor optical amplifier uses a cross-phase modulation of the semiconductor optical amplifier. That is, the Mach-Zehnder interferometer takes advantage of the fact that the phase of the continuous-wave signal is varied depending on the optical power of the input optical signal in a state of the gain saturation of the semiconductor optical amplifier. When a cross-phase modulation is used, input current to each semiconductor optical amplifier is differentiated to increase the phase difference between the paths A and B.

Therefore, conventionally, since phase of the continuous-wave signal is varied depending on the intensity of the input optical signal and a desired operational characteristic can be obtained only in a specific range of the intensity of the input optical signal and only with a specific input current to the semiconductor optical amplifier (SOA), an operational range was very restrictive.

SUMMARY OF THE INVENTION

It is an object of the present invention to alleviate a restriction on the operational input power dynamic range by making no phase difference between paths be generated depending upon the variation of an input optical power, unlike the cross-phase modulation type logic element using a semiconductor optical amplifier.

Another object of the present invention is to provide a logic element having available advantages such as elimination of noises and increase of extinction ratio.

In order to accomplish the above objects, the present invention provides a logic element comprising: a first saturable absorber for receiving a combined power of a first input optical signal and a reference signal, its passing power being higher than its absorbed power if the combined power is higher than a first transparent input power and its absorbed power being higher than its passing power if the combined power is lower than the first transparent input power level; a second saturable absorber for receiving a combined power of a second input optical signal having a wavelength different from that of the first input optical signal and the reference signal, its passing power being higher than its absorbed power if the combined power is higher than a second transparent input power and its absorbed power being higher than its passing power if the combined power is lower than the second transparent input power; and a combiner for combining an output of the first saturable absorber and an output of the second saturable absorber, wherein the reference signal has an optical power lower than the first and second transparent input powers, and the combined power of the first input optical signal and the reference signal and the combined power of the second input optical signal and the reference signal are higher than the first and second transparent input powers, respectively.

Further, the logic element may further comprise a phase shifter arranged between the first saturable absorber and the combiner or between the second saturable absorber and the combiner, an XOR logic element is implemented when the phase shifter generates a phase difference by π, and an OR logic element is implemented when the phase shifter generates a phase difference by zero Furthermore, the reference signal inputted to the first saturable absorber and the second saturable absorber is generated by dividing a continuous-wave signal into two half signals having the same power and the two half signals are inputted to the first and second saturable absorbers, respectively.

Furthermore, the logic element may further comprise an optical amplifier provided at an output end of the combiner, the gain of optical amplifier is saturated or output power of the optical amplifier is kept constant when the input optical signal has an optical power higher than a saturation input optical power, wherein a combined power $P_{tr,out}$ of the first and second transparent output optical powers of the respective first and second saturable absorbers is higher than the saturation input optical power.

BRIEF DESCRIPTION OF THE DRAWINGS

The aforementioned aspects and other features of the present invention will be explained in the following description, taken in conjunction with the accompanying drawings, wherein:

FIGS. 6A to 6D are conceptual diagrams illustrating an output signal depending upon the intensity of an input optical signal of the logic element in FIG. 5.

DETAILED DESCRIPTION OF PREFERRED EMBODIMENTS

Now, an OR logic element according to a preferred embodiment will be described with reference to FIG. 2. However, the present invention is not limited to the embodiment described below, and a variety of modifications could be made to the embodiments. The embodiments are provided to more completely explain the present invention to those skilled in the art.

Figure 1A:
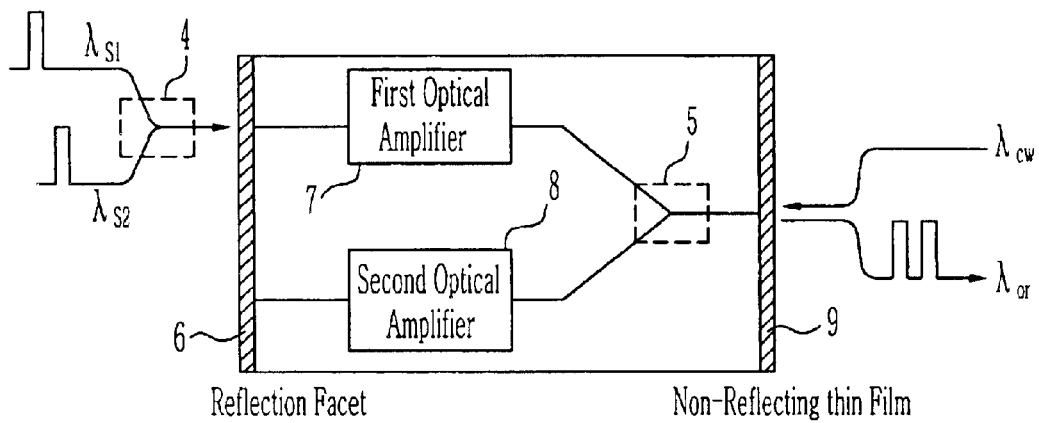
FIGS. 1A and 1B are schematic diagrams of the conventional all-optical logic element using a semiconductor optical amplifier.
Figure 1B:
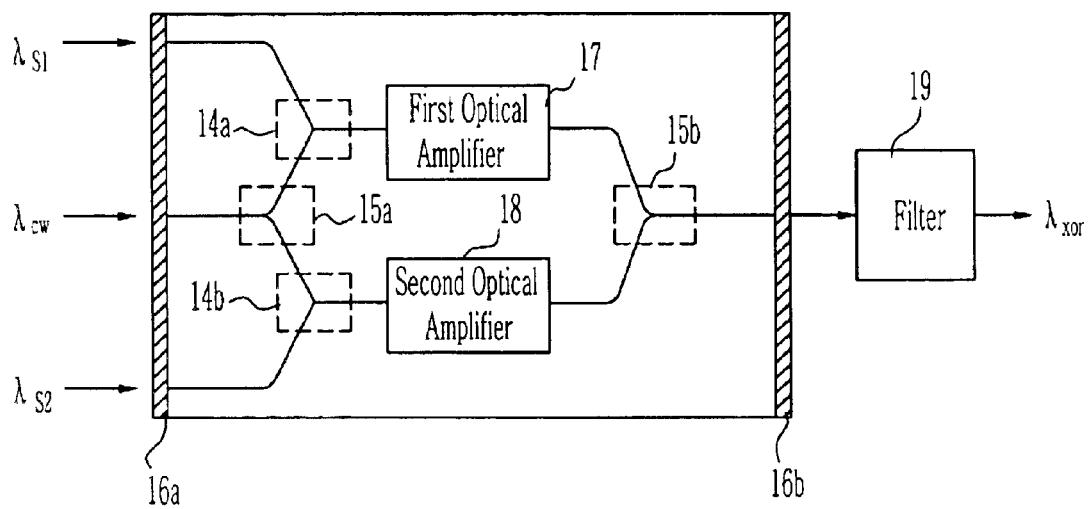
Figure 2:
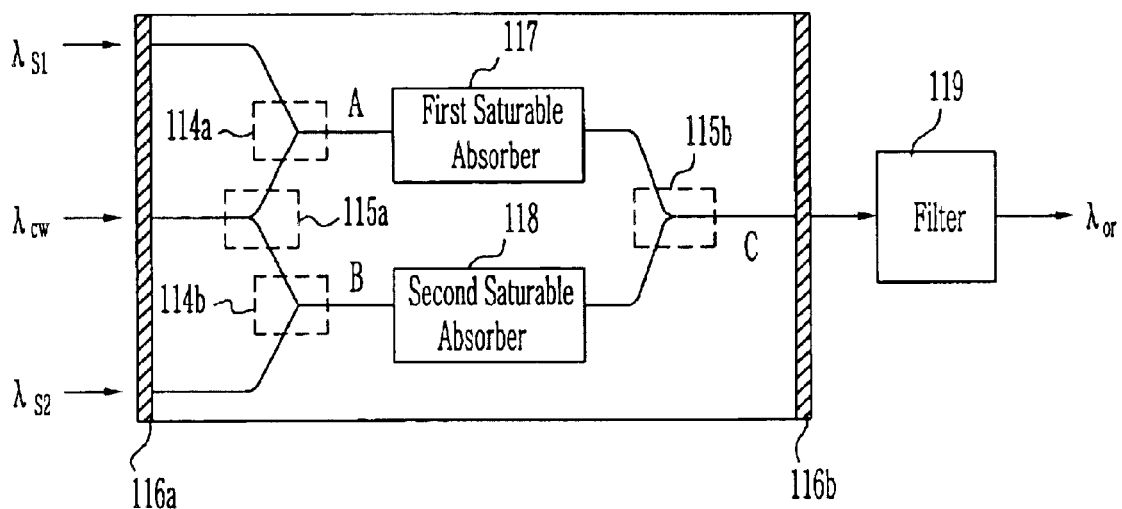
FIG. 2 is a schematic diagram of an all-optical logic element according to an embodiment of the present invention.

Referring to FIG. 2, a logic element according to a preferred embodiment of the present invention includes first and second saturable absorbers 117 and 118, anti-reflecting thin films 116a and 116b, Y-combiners 114a, 114b and 115b, a Y-branch 115a, and a filter 119.

The saturable absorbers 117 and 118 are usually used for a pulse laser such as a mode locking laser diode disclosed in IEEE electron. Lett., 26, 1087 (1990), by S. Sanders et al., and currently apply to elimination of noise as disclosed in CLEO, 329 (2000), by Z. Bakonyi et al., optical discrimination as disclosed in IEEE Electron. Lett., 34, 198 (1998), by A. Hirano et al., etc. When the input optical signals having a power lower than the transparent input power $P_{tr,in}$ are inputted to the saturable absorbers, the saturable absorbers absorb much of the input optical power, and thus their output optical powers are low. When the input optical signals having a power not lower than the transparent input optical power $P_{tr,in}$ are inputted to the saturable absorbers, the saturable absorbers output most of the input optical signals. For this reason, when the optical signals with noises are inputted to the saturable absorbers, the noises can be removed by setting power of the noises to be lower than the transparent input optical power. For a detailed description of a saturable absorber, refer to Korean Patent Application No. 2000-0063662, assigned to the assignee of the present invention.

Figure 5:
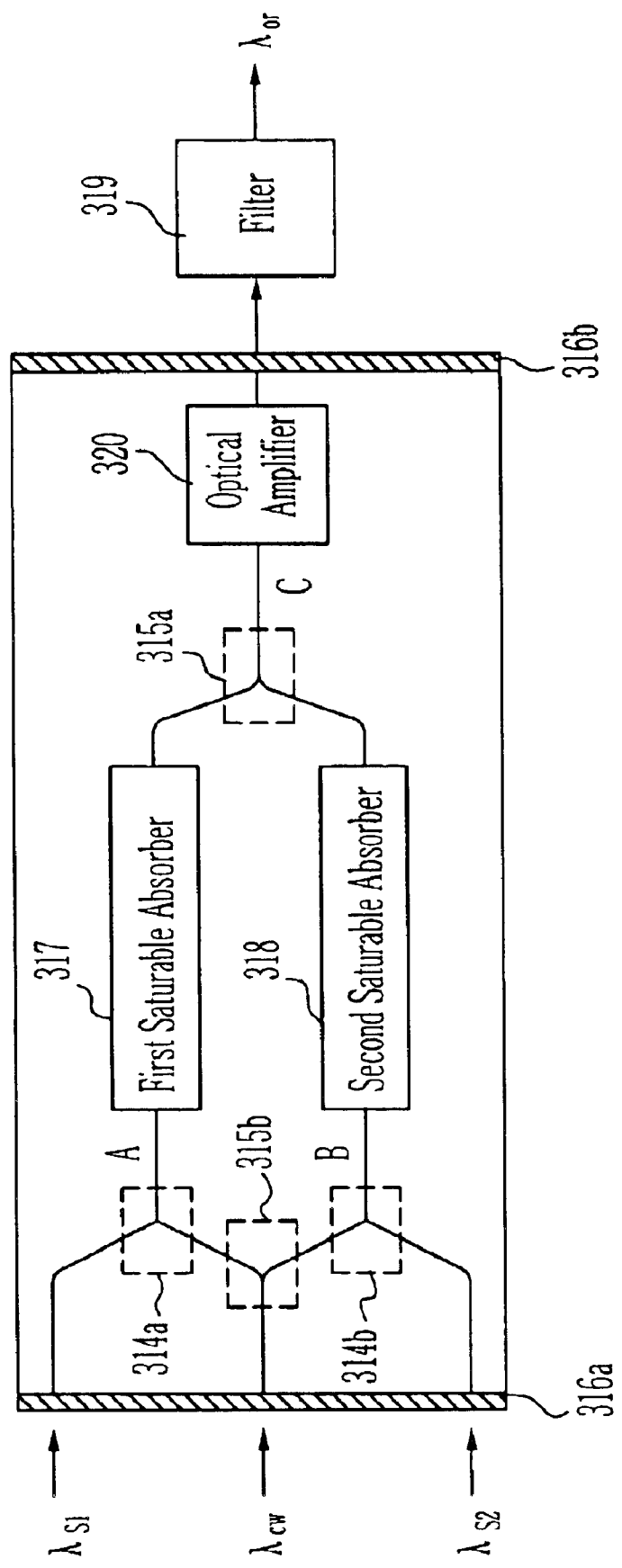
FIG. 5 is a schematic diagram of a logic element according to another embodiment of the present invention.

The anti-reflecting thin films 116a and 116b serve for easily coupling the input optical signal to the logic element. If a surface is cleaved without the anti-reflecting thin films, the reflectivity reaches about 30%, and thus a coupling loss between optical fiber and the element is generated as much. Also, the anti-reflecting thin films 116a and 116b having the reflectivity serve for removing the Fabry-Perot resonance that can happen with the small amount of current into the optical amplifier in an optical amplifier integrated structure as shown in FIG. 5.

A filter 119 is used for separating the input optical signals of $\lambda_{s1}$ and $\lambda_{s2}$, from the modulated logic signal of $\lambda_{or}$. The filter 119 is a band-pass filter which eliminates dispensable wavelength $\lambda_{s1}$ and $\lambda_{s2}$ and passes a desired wavelength through. For example, if a photo detector without the wavelength selectivity is used to convert a modulated optical signal into an electrical signal, the filter 119 can be useful for separating the desired signal from the dispensable signal.

In the operations of the above logic element, first, the modulated input optical signals of $\lambda_{s1}$ and $\lambda_{s2}$ are inputted to the Y-combiners 114a and 114b, respectively. Simultaneously, a continuous-wave signal having a desired wavelength $\lambda_{cw}$ is inputted to the Y-branch 115a. By means of the Y-branch 115a, the optical power of the continuous-wave signal is divided into two halves in two paths A and B, respectively. By means of the Y-combiner 114a and 114b the powers of the continuous-wave signal and the modulated input optical signals are combined, respectively.

The modulated input optical signals of $\lambda_{s1}$ and $\lambda_{s2}$ and the continuous-wave signal of $\lambda_{cw}$ are absorbed or passed by the first and second saturable absorbers 117 and 118 depending on their power level. More particularly, if the sum of the power of the input optical signal having a wavelength of $\lambda_{s1}$ and the half power $\lambda_{cw/2}$ of the continuous-wave signal $\lambda_{cw}$ is lower than the transparent input power $P_{tr,in}$ of the saturable absorbers, most of them are absorbed by the corresponding saturable absorbers. If the sum is more than the transparent input power, most of input optical power passes through the corresponding saturable absorber. Consequently, whether the first saturable absorber 117 and the second saturable absorber 118 pass or absorb the optical power respectively depends on the corresponding input optical signals of $\lambda_{s1}$ and $\lambda_{s2}$. The powers of the optical signals passing through the first and second saturable absorbers 117 and 118 are combined by the Y-combiner 115b without any path difference, and then are outputted to a filter 119.

Figure 3A:
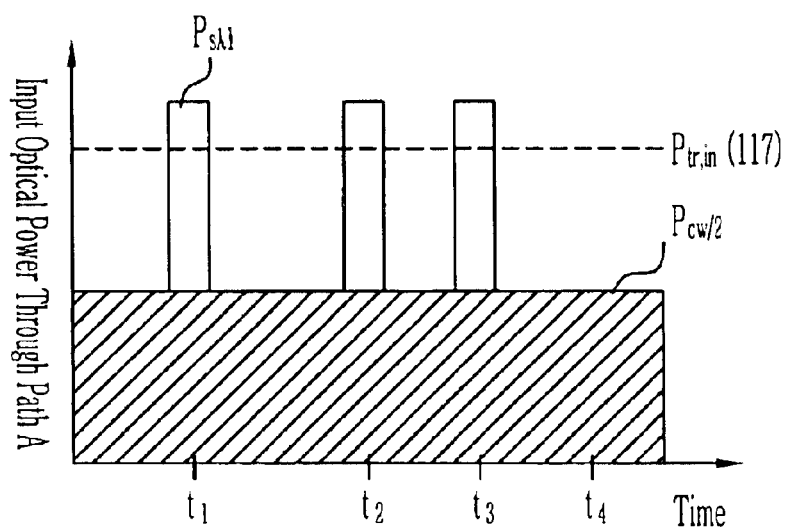
FIGS. 3A to 3E are conceptual diagrams illustrating an output signal depending upon the input optical signal of the logic element in FIG. 2.
Figure 3B:
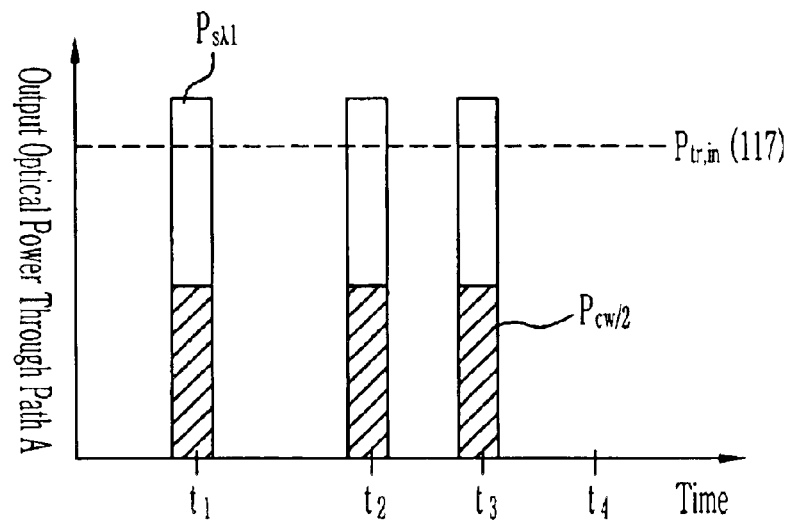
Figure 3C:
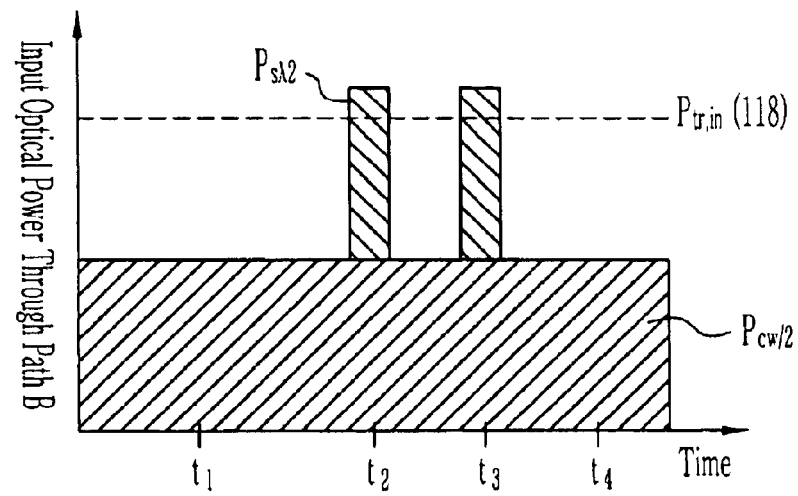
Figure 3D:
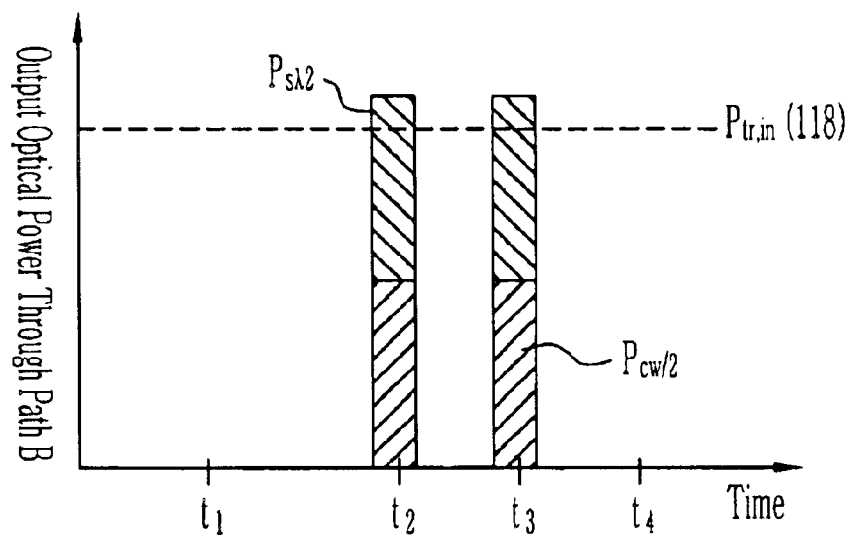
Figure 3E:
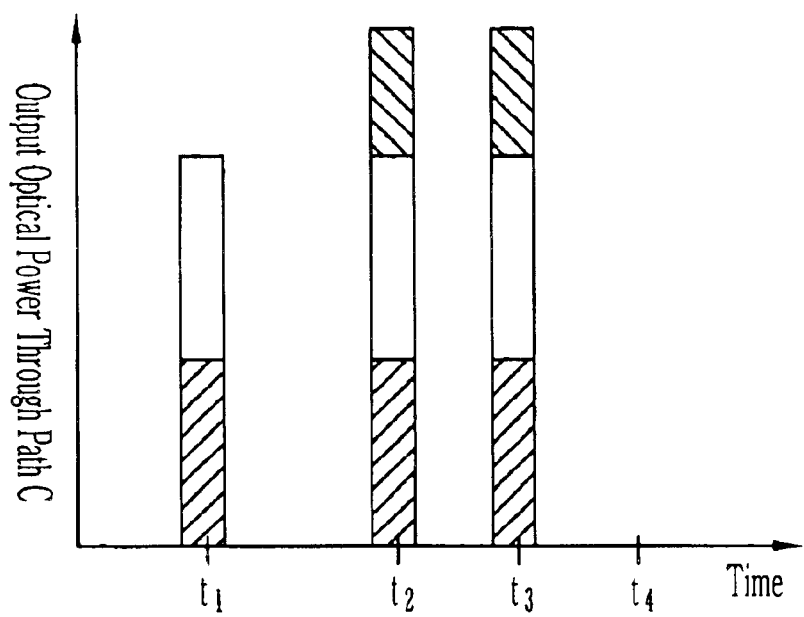

Referring to FIGS. 3A and 3E, the output optical signals depending upon the input optical signal in the above logic element will be described in detail. FIG. 3A illustrates the input optical signals through path A at times $t_1$, $t_2$ and $t_3$. These signals pass through the first saturable absorber 117 and then the half power $\lambda_{cw/2}$ of the continuous-wave signal less than the transparent input power is entirely absorbed. Finally, the signals shown in FIG. 3B remain. In addition, FIG. 3C illustrates the input optical signals of $\lambda_{s2}$ through path B at times $t_2$ and $t_3$. These signals pass through the second saturable absorber 118, and then the half power $\lambda_{cw/2}$ of the continuous-wave signal less that the transparent input power is entirely absorbed. Finally, the signals shown in FIG. 3D remain. Therefore, the signals passing through the paths A and B and saturable absorbers 117 and 118 can be illustrated as shown in FIG. 3E. In other words, this shows that an OR logic element can be implemented.

If the input optical signal of $\lambda_{s1}$ is "1" and the input optical signal of $\lambda_{s2}$ is "0" at time $t_1$, the total output optical signal is "1". Similarly, if the input optical signal of $\lambda_{s1}$ is "1" and the input optical signal of $\lambda_{s2}$ is "1" at time $t_2$, the output optical signal is "1". Also, if the input optical signal of $\lambda_{s1}$ is "0" and the input optical signal of $\lambda_{s2}$ is "0" at time $t_4$, the output optical signal is "0".

Using these characteristics, the OR logic element can be implemented. The output optical signals corresponding to the input optical signals of $\lambda_{s1}$ and $\lambda_{s2}$ are shown in table 1.

TABLE 1

| $\lambda_{s1}$ | $\lambda_{s2}$ | $\lambda_{or}$ |
|---|---|---|
| 0 | 0 | 0 |
| 1 | 0 | 1 |
| 0 | 1 | 1 |
| 1 | 1 | 1 |

In this case, the transparent input optical powers $P_{tr,in}$ of the saturable absorbers are preferably more than the half power $\lambda_{cw/2}$ of the continuous-wave signal, respectively.

On the other hand, in comparison with the Mach-Zehnder interferometer using the conventional semiconductor optical amplifier, the optical logic element described above is expected to improve the characteristics of the saturable absorbers, that is, noise elimination and increase of extinction ratio, etc.

Preferably, the first and second saturable absorbers 117 and 118 are set to have the same transparent input power, so that the input current to the first saturable absorber 117 and the second saturable absorber 118 can be equalized. In addition, unlike the a cross-phase modulation type optical logic element using the conventional SOA, there is no phase difference between paths A and B, so that a restriction on the operational input power dynamic range can be alleviated.

Figure 4:
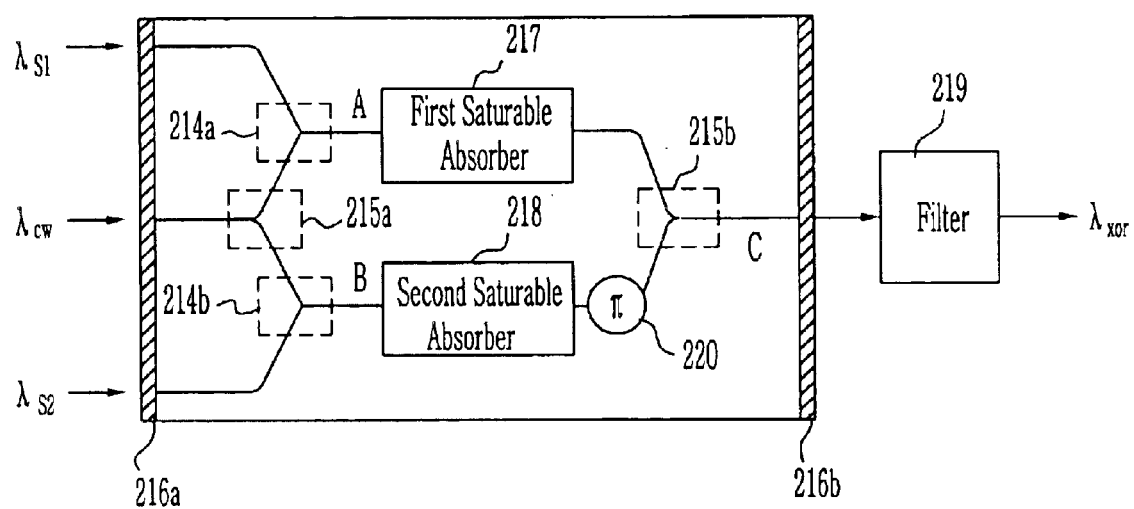
FIG. 4 is a schematic diagram of a logic element according to another embodiment of the present invention.

Now, another embodiment of the present invention will be described with reference to FIG. 4.

The logic element according to another preferred embodiment of the present invention constitutes an XOR logic element whereas the logic element in FIG. 2 constitutes an OR logic element. Paying attention to the differences from the logic element in FIG. 2, the logic element in FIG. 4 further includes a phase shifter 220 between the Y-combiner 215b and the output end of the first saturable absorber 217 or the second saturable absorber 218.

In this case, if the phase shifter 220 generates a phase difference by zero, the logic element operates as an OR logic element similarly to the logic element in FIG. 2. On the contrary, if the phase shifter 220 generates a phase difference by $\pi$, it operates as an XOR.

In other words, supposing the phase shifter generating a phase difference by $\pi$ is included in path B, when the input optical signal of $\lambda_{s1}$ is "1" and the input optical signal of $\lambda_{s2}$ is "0" at a given time $t_1$, the output optical signal is "1" as described above. When the input optical signal of $\lambda_{s1}$ is "1" and the input optical signal of $\lambda_{s2}$ is "1" at a given time $t_2$, the output optical signal is "0" due to a destructive interference between the signals through two paths when they are combined by Y-combiner 215b. When the input optical signal of $\lambda_{s1}$ is "0" and the input optical signal of $\lambda_{s2}$ is "1" at a given time $t_3$, the output optical signal is "1". When the input optical signal of $\lambda_{s1}$ is "0" and the input optical signal of $\lambda_{s2}$ is "0" at a given time $t_4$, the output signal is "0".

Using these characteristics, an XOR logic element can be implemented. The output optical signals of the XOR logic element depending upon the input optical signals of $\lambda_{s1}$ and $\lambda_{s2}$ are shown in Table 2.

TABLE 2

| $\lambda_{s1}$ | $\lambda_{s2}$ | $\lambda_{xor}$ |
|---|---|---|
| 0 | 0 | 0 |
| 1 | 0 | 1 |

TABLE 2-continued

| $\lambda_{s1}$ | $\lambda_{s2}$ | $\lambda_{xor}$ |
|---|---|---|
| 0 | 1 | 1 |
| 1 | 1 | 0 |

In this case, similarly to the logic element in FIG. 2, the transparent input powers of the saturable absorbers are preferably set to be more than the half power $\lambda_{cw/2}$ of the continuous-wave signal.

On the other hand, in accordance with another embodiment of the present invention, the logic element in FIG. 5 may further comprise an optical amplifier 320 at the output end of the Y-combiner 315a of the logic element in FIG. 2. The optical amplifier 320 performs amplification by its gain when the input optical signal having a optical power less than the saturation input optical power $P_{sat,in}$ is inputted, whereas the output optical power is saturated and outputted when the input optical signal having a optical power more than the saturation input optical power.

Accordingly, when the optical amplifier 320 is added to the output end of the Y-combiner 315a and the combined power of the transparent output optical powers $P_{tr,out}$ of the respective saturable absorber 317 and 318 is set to be more than the saturation input optical power $P_{sat,in}$ of the optical amplifier 320, the noises having a power less than the transparent input optical power of the saturable absorber are absorbed by the saturable absorber, and thus the noises are eliminated (in absorbing region). In addition, the input optical signal having a optical power more than the transparent input optical power of the saturable absorber passes through the saturable absorber with little loss in a saturable absorber region. In a while, it is possible to keep the output optical power substantially constant when the power more than the saturation input optical power $P_{sat,in}$ of the optical amplifier is applied. The optical signal passing through the saturable absorber is amplified by the optical amplifier into the saturation output optical power, and then is outputted in a constant output optical power. This operation will be described in detail with reference to FIGS. 6A to 6D.

Figure 6A:
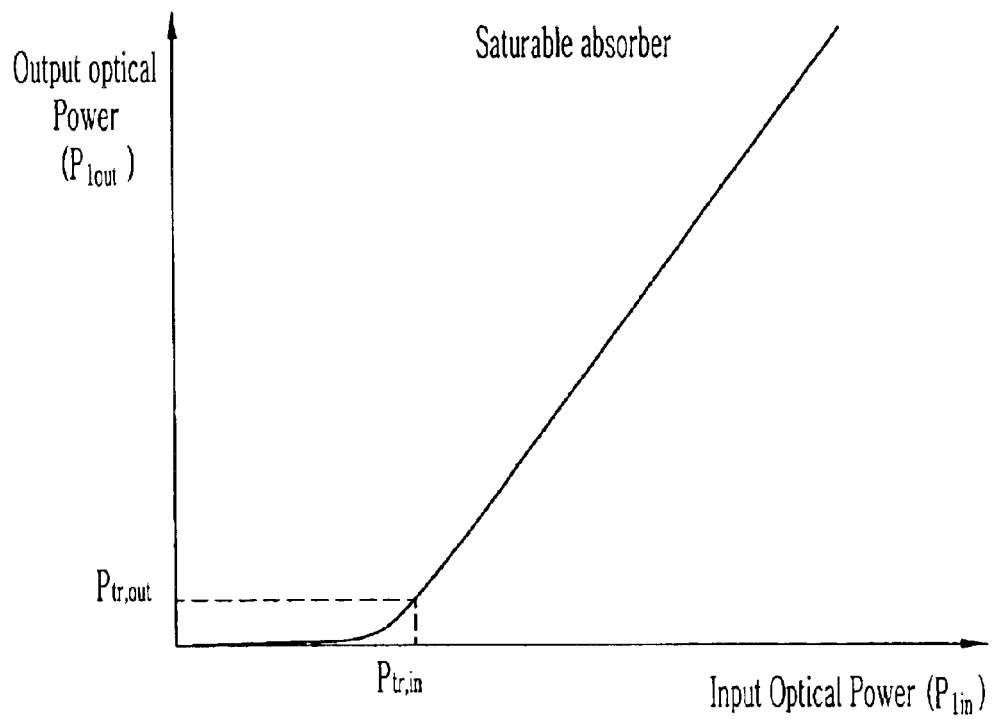

Referring to FIG. 6A, in the saturable absorber, if the optical signal with the power less than the transparent input optical power $P_{tr,in}$ is inputted, the output optical power is low due to large absorption by the saturable absorber, whereas if the optical signal with the power more than the transparent input optical power $P_{tr,in}$ is inputted, most of the input optical signals are outputted as output optical signals.

Figure 6B:
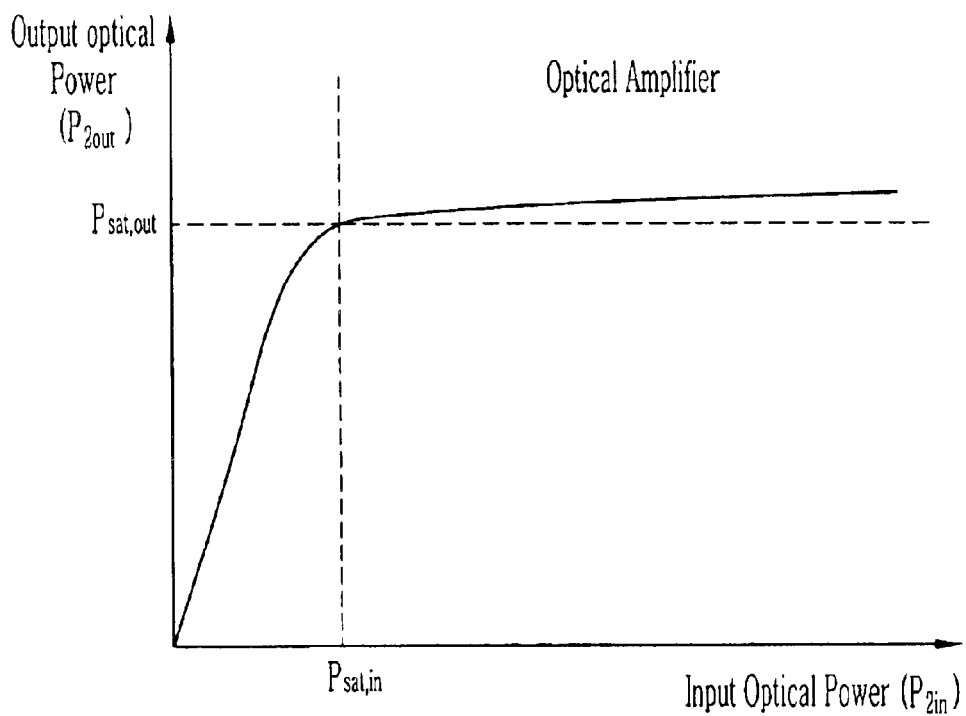

Referring to FIG. 6B, if the optical signal with the power less than the saturation input optical power $P_{sat,in}$ is inputted, the optical amplifier amplifies the input optical signal by its gain, whereas if the optical signal with the power more than the saturation input optical power $P_{sat,in}$ is inputted, the output optical power $P_{2out}$ is outputted in a saturated state.

FIG. 6C is a graph illustrating the variation of the output optical powers corresponding to the input optical powers when the combined power of the respective transparent output optical powers $P_{tr,out}$ of the saturable absorbers 317 and 318 is matched with the saturation input optical power $P_{sat,in}$ of the optical amplifier 320.

FIG. 6D illustrates the waveform of the output optical power corresponding to the input optical power when the combined power of the respective transparent output optical powers $P_{tr,out}$ of the saturable absorbers 317 and 318 is matched with the saturation input optical power $P_{sat,in}$ of the optical amplifier. As shown in the drawing, it is known that the optical logic element according to an embodiment of the present invention can perform various functions such as noise elimination, improvement of extinction ratio, and equalization of output power respect to different input signal power. Also, it is known that the optical signals having a time jitter can also be re-shaped and re-amplified (2R). That is, the time jitters of an input optical signal can be significantly reduced using the logic element of the present invention.

On the other hand, although it was described that the combined power of the respective transparent output optical powers $P_{tr,out}$ of the saturable absorbers 317 and 318 is matched with the saturation input optical power $P_{sat,in}$ of the optical amplifier in FIG. 6C. it should be noted that similar effects can also be achieved even when the combined power $P_{tr,out}$ is set to be more than the saturation input optical power.

Up to now, the present invention has been described in detail through the specific embodiments. However, it is noted that the present invention is not limited to it, and various modifications or improvements thereof may be envisaged to those skilled in the art.

In comparison with the Mach-Zehnder interferometer type logic element using the conventional optical amplifier, the optical logic element described above has advantages that the characteristics such as the noise elimination, the increase of extinction ratio, etc. are improved.

Further, unlike the a cross-phase modulation type logic element using the conventional SOA, by setting currents applied to the first and second saturable absorbers to be equal, the path phase difference is not varied due to the optical power of the input optical signal, and as a result, a restriction on the operational input power dynamic range can be alleviated.

What is claimed is:

1. A logic element comprising:
    a first saturable absorber for receiving a combined power of a first input optical signal and a reference signal, its passing power being higher than its absorbed power if the combined power is higher than a first transparent input power and its absorbed power being higher than its passing power if the combined power is lower than the first transparent input power;
    a second saturable absorber for receiving a combined power of a second input optical signal having a wavelength different from that of the first input optical signal and the reference signal, its passing power being higher than its absorbed power if the combined power is higher than a second transparent input power and its absorbed power being higher than its passing power if the combined power is lower than the second transparent input power; and
    a combiner for combining an output of the first saturable absorber and an output of the second saturable absorber,
    wherein the reference signal has an optical power lower than the first and second transparent input powers, and the combined power of the first input optical signal and the reference signal and the combined power of the second input optical signal and the reference signal are higher than the first and second transparent input powers, respectively.

2. A logic element according to claim 1, wherein the reference signal inputted to the first saturable absorber and the second saturable absorber is generated by dividing a continuous-wave signal into two half signals having the same powers, and the two half signals are inputted to the first and second saturable absorbers, respectively.

3. A logic element according to claim 1, wherein the first transparent input power and the second transparent input power are equal to each other.

4. A logic element according to claim 1, wherein the reference signal inputted to the first saturable absorber and the second saturable absorber is generated by dividing a continuous-wave signal into two half signals having the same powers, and the two half signals are inputted to the first and second saturable absorbers, respectively.

5. A logic element according to claim 1, further comprising a phase shifter arranged between the first saturable absorber and the combiner or between the second saturable absorber and the combiner.

6. A logic element according to claim 5, wherein an XOR logic element is implemented when the phase shifter generates ". . . a phase difference by $\pi$," and an OR logic element is implemented when the phase shifter generates a phase difference by zero.

7. A logic element according to claim 1, further comprising an optical amplifier provided at an output end of the combiner, the optical amplifier saturating its input optical signal when the input optical signal has an optical power higher than a saturation input optical power, wherein a combined power $P_{tr,out}$ of the first and second transparent output optical powers of the respective first and second saturable absorbers is higher than the saturation input optical power.

* * * * *